Dec. 14, 1943.   E. W. WELP   2,336,659
WATER SOFTENING APPARATUS
Filed April 19, 1941
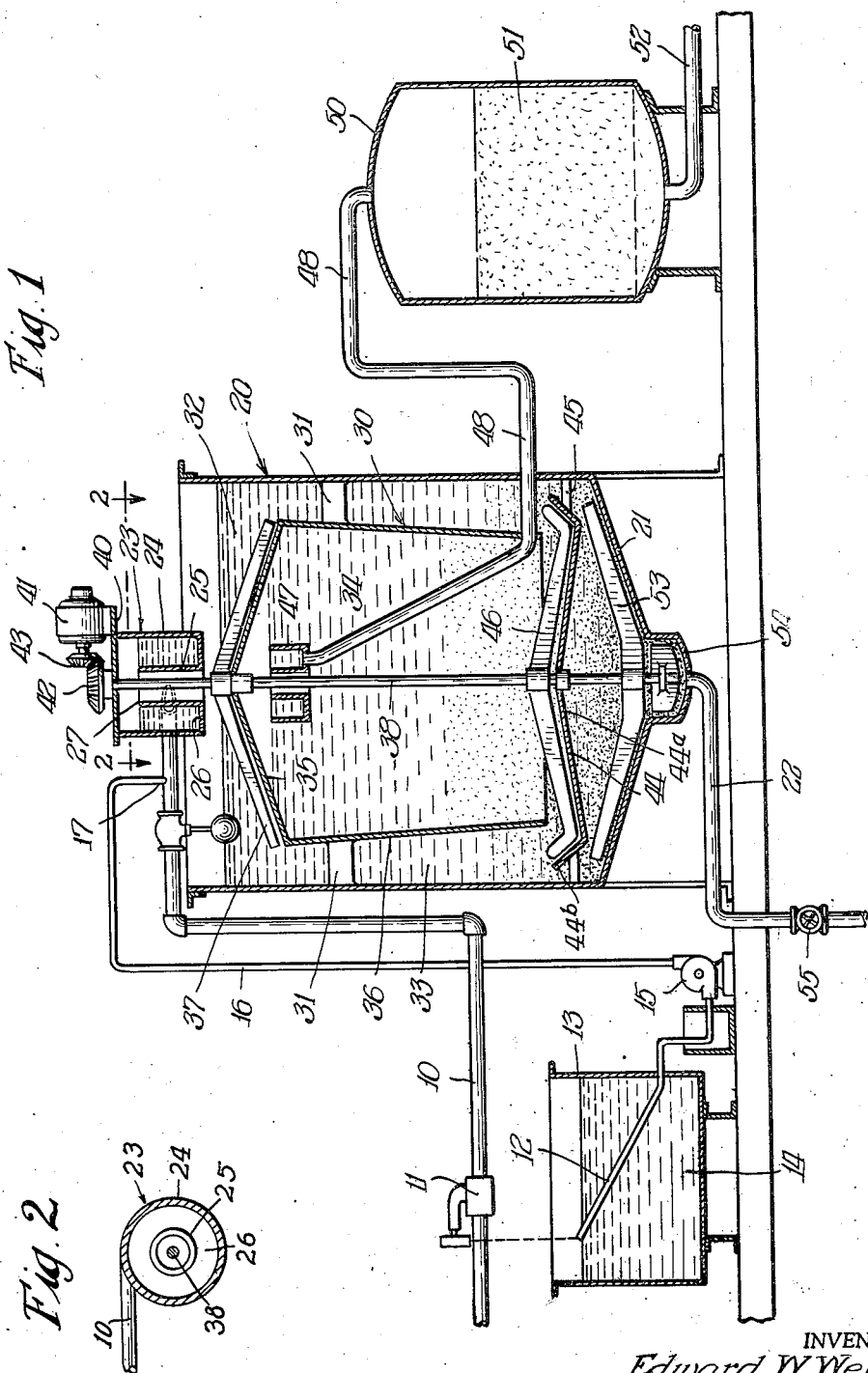
INVENTOR.
Edward W. Welp,
BY Patented Dec. 14, 1943

2,336,659

UNITED STATES PATENT OFFICE 2,336,659

WATER SOFTENING APPARATUS

Edward W. Welp, Chicago, Ill., assignor to Graver Tank & Mfg. Co., Inc., Catasauqua, Pa., a corporation of Delaware Application April 19, 1941, Serial No. 389,314

3 Claims. (Cl. 210—16)

The invention relates to water softening apparatus and has more particular reference to improved apparatus which will intimately mix chemicals with a liquid to be treated and which will filter the chemically treated liquid through a bed of precipitated sludge whereby a softened and clarified liquid may be continuously drawn off and the spent sludge continuously discharged from the bottom of the unit.

The use of chemicals for softening water has been a well known process for many years. In its earliest form the lime-soda water softening unit was of the intermittent type in which a predetermined quantity of lime and soda ash was added to a known quantity of water, the mixture agitated and then allowed to settle, after which the water was ready for use. By heating the water prior to chemical treatment most of the carbonates of lime and magnesium principally responsible for the hardness of the water were caused to precipitate. This additional treatment resulted in increased capacity of the apparatus then in use.

An object of the present invention is to provide an improved method and apparatus for softening water which will overcome all the disadvantages of previous designs.

Another object resides in the provision of a water softening device for intimately mixing water with the required chemicals before the mixture is delivered to a coagulation chamber.

Another object is to provide a water softening device which will embody upward sludge filtration for completing the physical reactions and which will additionally assure satisfactory removal of suspended particles.

In operation of the present apparatus the water is forced to flow upward at a very low velocity through a bed of precipitated sludge. The sludge is kept flocculent and gently moved to the spent sludge compartment by means of scrapers which rotate at a very low rate. This procedure allows the precipitated solids in the water to come into intimate contact with the physically unreacted or incompletely reacted materials in the sludge bed, and thus causes them to react completely. Also upward filtration through the bed of sludge removes the finely divided suspended particles in the water and this yields a product which is clear and of high quality.

With these and various other objects in view the invention may consist of certain novel features of construction and operation as will be more fully described and particularly pointed out in the specification, drawing and claims appended hereto.

In the drawing which illustrates an embodiment of the invention and wherein like reference characters designate like parts—

Figure 1 is a diagrammatic view illustrating the invention with the chemical tank, the water softening apparatus and the filter tank shown in section, and Figure 2 is a detail sectional view taken substantially along line 2—2 of Figure 1 showing the tangential connection of the water supply pipe with the mixing chamber.

The water to be treated is supplied to the water softening apparatus by the water supply main 10. The raw water flowing through the main is metered by the control device 11 which regulates the swing pipe 12 located in the chemical tank 13 containing a supply 14 of the chemicals for treating the water. The elevation of the swing pipe is varied depending on the flow of raw water through the main 10 and in accordance with the position of the pipe 12 the required quantity of chemical is permitted to flow to the pump 15. The pump is suitably driven by an electric motor or other source of power to force the liquid 14 containing the water treating chemicals to flow through pipe 16 which connects with the water main at 17. In this manner the chemicals are injected into the raw water in advance of the delivery of the water to the softening apparatus.

The apparatus for reacting the chemicals with the water includes a tank 20 having a conical bottom 21 provided with a sludge outlet 22 and having an open top with a centrally located mixing chamber 23 suitably supported by the side walls of the tank. The mixing chamber is annular in form, having the raw water supply pipe 10 tangentially connecting therewith so as to thoroughly mix the chemicals with the raw water. The outer wall 24 and the inner wall 25 are joined by the bottom 26 to form the annular mixing chamber and said inner wall in addition forms a weir over which the raw water flows to the tank 20. It will be observed that the weir 27 formed by the top of the inner wall determines the height of the liquid in the mixing chamber and as the flow continues the mixture will in turn flow over said weir and down the inner wall 25 to the interior of the tank 20.

Reference is made to the Seip Patent No. 2,103,796, of December 28, 1937, for a full understanding of the apparatus within the tank 20. An inverted bell-shaped member 30 is located within the tank, being suitably supported in spaced relation with the cylindrical wall of the tank by supports 31. The inverted bell-shaped member provides a coagulation chamber 32, a peripheral feed channel 33 and a settling chamber 34 from which the clear liquid is drawn off. The raw water to which has been added soda ash and lime is delivered to the coagulation chamber centrally thereof and coagulation is facilitated by the low velocity maintained in said chamber. Also a sufficiently low velocity of flow is maintained in the peripheral feed channel 33 to prevent disruption of the coagulated particles and to promote sedimentation. From the peripheral feed channel the liquid flows into the settling chamber, passing upward through a sludge bed, thus causing complete reaction of all the unspent sludge in the bed and satisfactory filtering out of the majority of finely divided particles contained in the water.

The coagulation chamber 32 is formed by the substantially horizontal tray or partition 35 and the peripheral feed channel is formed by the flange 36 depending from the tray which is in spaced relation with the cylindrical wall of the tank 20. The precipitates and other matter settling on the tray 35 are gently moved outward by the scraper arms 37 secured to the rotating shaft 38. The shaft extends vertically through the center of the tank 20 from below the conical bottom 21, through the inverted bell-shaped member 30 and through the mixing chamber 23. The portion of shaft 38 projecting above platform 40 on the mixing chamber is operatively connected with the electric motor 41 by the meshing bevelled gears 42 and 43. The shaft is rotated at a relatively low rate so that the scraper arms 37 will propel the matter settling on the tray 35 with a gentle movement, thereby maintaining low velocities in the coagulation chamber. The central discharge of the raw water to the coagulation chamber allows the water to flow radially from the center at a relatively low velocity to the peripheral feed channel. In the feed channel reaction between the chemicals and the raw water results in precipitating a large proportion of the insoluble calcium carbonates. Other impurities in the water and the coagulated particles formed in the chamber 32 are precipitated and settled since the flow in the peripheral feed channel is in a downward direction and the velocities are very low.

A feature of the invention resides in the provision of a sludge tray 44 below the inverted bell-shaped member 30 for retaining the unreacted materials until they have had a chance to complete their physical reaction. This may be termed the unspent sludge which, of course, includes the precipitates and other matter settling out from the liquid. The tray is stationary, being suitably supported by rods 45, and the sludge bed on the tray is discharged over the peripheral edge of the same at the desired rate by scraper arms 46, having a formation conforming to that of the tray. The scraper arms are secured to the rotating shaft 38 so that the said arms are revolved at a low rate to accomplish their purpose. The sludge from tray 44 is discharged in a manner to maintain a sludge bed on the tray and which bed will extend upwardly within settling or clarifier chamber 34 formed by the bell-shaped member 30. In fact, the entrance to the open bottom of the inverted bell-shaped member is in effect closed by this sludge bed which includes flocculent material varying in size and density. The water is caused to flow from the peripheral feed channel through this bed of sludge in order to reach the upper portion of the clarified chamber from which the clear liquid is drawn off. The flow of the water within said chamber is therefore in an upward direction but this flow is maintained at a relatively low rate so that the flocculated particles and other finely divided particles in suspension above the sludge tray 44 will not tend to rise above a predetermined level. As the flow continues in an upward direction the same is therefore subjected to a filtering action which effectively removes the finely divided particles which agglomerate to form larger particles so that they are eventually precipitated onto the sludge tray 44. The sludge bed above described has an additional function, namely, to permit reaction between the water and the unspent chemicals.

The treated liquid in the clarified chamber 34 is continuously drawn off from the clear liquid outlet 47 by the outlet pipe 48 which connects with outlet 47 at the bottom thereof and extends through the depending flange 36 and through the wall of the tank 20 to in turn connect with a filter tank 50. The filter may contain the usual filtering bed 51 consisting of layers of finely divided material such as sand or quartz. From the bottom of the tank the treated liquid which has been additionally filtered is drawn off by the outlet pipe 52 and delivered to the service main or to any other installation as desired. By adding to the hard water a predetermined quantity of lime and soda ash and reacting the same in the apparatus of the present invention the hardness of the water can be materially reduced. In fact, it has been found that the water continuously drawn off by outlet pipe 48 has the desired softness and that said water is usually clear enough without subsequent filtration. In a test on a raw water having approximately 200 P. P. M. of turbidity and a hardness of 16 grains per U. S. gallon it was found that after sixty minutes reaction time in the water softening device of the invention the turbidity was reduced to 10 P. P. M. and the hardness to 1.3 grains per U. S. gallon. By passing the softened and relatively clear water through the filter tank 50 the last traces of turbidity were removed.

The formation given to the sludge tray 44 is such as to retain on the tray a large proportion of the precipitates and impurities settling out from the water undergoing treatment in tank 20. The shape of the tray is also such as to promote distribution of the flow below the sludge bed in the chamber 34. For this purpose the tray 44 comprises an outward and downwardly sloping center portion 44a, extending from the center to a point substantially below the lower edge of the bell-shaped member 30, and an inwardly sloping rim portion 44b, extending from that point to a point adjacent to but spaced from the tank wall.

The proper depth of sludge bed on the tray 44 is controlled by rotating the scrapers 46 at a predetermined rate. The scrapers will discharge the sludge over the peripheral edge of the tray and this spent sludge will collect on the conical bottom 21 of the unit. Additional scrapers 53 are provided in this spent sludge compartment which act reversely to scrapers 46 and 37 in that they tend to concentrate the spent sludge toward the center of the apparatus which is provided with a depending bottom portion 54. The concentrated sludge collecting in the bottom 54 is gradually discharged through the sludge outle 22. The rate of discharge may be controlled by valve 55 located in said outlet.

What is claimed is:

1. In a water softening apparatus, a cylindrical tank, an open bottom member positioned within said tank, said member including a substantially horizontal tray and a peripheral depending flange spaced from the cylindrical tank wall, whereby the member provides a settling chamber within the same and the depending flange forms a peripheral feed channel with the cylindrical tank wall, a chamber located above the tray and having connection with means supplying water and softening reagents thereto, said chamber having a circular weir over which the liquid is discharged to the tank, a clear liquid outlet located within the settling chamber, a sludge tray below the open bottom of said member and extending into the peripheral feed channel, a discharge outlet for the sludge in the bottom of the tank below the sludge tray, scraper arms positioned above the sludge tray and mounted for rotation with respect thereto, and means rotating the scraper arms for removing sludge from said tray, said tray having a shape to retain the sludge thereon until removed by the scrapers.

2. In a water softening apparatus, a cylindrical tank, an open bottom member positioned within said tank, said member including a substantially horizontal tray and a peripheral depending flange spaced from the cylindrical tank wall, whereby the member provides a settling chamber within the same and the depending flange forms a peripheral feed channel with the cylindrical tank wall, a mixing chamber located above the tray, a water supply pipe tangentially connected to the chamber for supplying water and softening reagents thereto, said chamber having a circular weir over which the liquid is discharged to the tank, a clear liquid outlet located within the settling chamber, said tank having a conical bottom providing a central discharge outlet for sludge, an auxiliary sludge tray below the open bottom of the member and extending into the peripheral feed channel, scraper arms positioned above the sludge tray and mounted for rotation with respect thereto, means rotating the scraper arms for removing sludge from said tray, and other rotating scrapers in associated relation with the conical bottom for moving the sludge centrally to the discharge outlet.

3. Apparatus for lime-soda water softening comprising a tank, partition means within the tank forming a peripheral chamber with the tank wall and also forming an inner chamber having location within said peripheral chamber and communicating therewith at a point adjacent to but spaced above the bottom of the tank, the water in said peripheral chamber flowing in a downward direction to promote coagulation and partial sedimentation of precipitated particles of hardness constituents, the water in the inner chamber flowing in an upward direction to promote a uniform bed of precipitated particles of hardness constituents suspended in the water, means for supplying hard water and softening reagents to an upper part of said peripheral chamber, means for removing precipitated particles of hardness constituents from the bottom of the tank, a liquid guiding member imperforate throughout its extent and having location below the partition means but above the bottom of the tank, said member extending into the peripheral chamber to direct the downwardly flowing liquid from said peripheral chamber to the inner chamber, and means for withdrawing softened water from the upper part of said inner chamber.

EDWARD W. WELP.